United States Patent
Huang et al.

(10) Patent No.: US 10,193,664 B2
(45) Date of Patent: Jan. 29, 2019

(54) ENHANCED RETRY COUNT FOR UPLINK MULTI-USER TRANSMISSION

(71) Applicants: Po-Kai Huang, Santa Clara, CA (US); Laurent Cariou, Portland, OR (US)

(72) Inventors: Po-Kai Huang, Santa Clara, CA (US); Laurent Cariou, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 198 days.

(21) Appl. No.: 15/393,382

(22) Filed: Dec. 29, 2016

(65) Prior Publication Data

US 2017/0359151 A1    Dec. 14, 2017

Related U.S. Application Data

(60) Provisional application No. 62/349,345, filed on Jun. 13, 2016.

(51) Int. Cl.
*G06F 11/00*  (2006.01)
*H04L 1/18*  (2006.01)

(52) U.S. Cl.
CPC .............. *H04L 1/188* (2013.01); *H04L 1/187* (2013.01)

(58) Field of Classification Search
CPC .. G06F 11/0751; G06F 11/0766; G06F 11/14; G06F 11/00; G06F 11/07; G06F 11/1402
USPC ................................................ 714/16, 48, 49
See application file for complete search history.

(56) References Cited

U.S. PATENT DOCUMENTS

| | | | |
|---|---|---|---|
| 8,284,742 B2 * | 10/2012 | Seok | H04L 41/5003 370/338 |
| 2014/0179238 A1 * | 6/2014 | Wynn | H04L 41/5067 455/67.11 |
| 2016/0315675 A1 * | 10/2016 | Seok | H04B 7/0452 |
| 2017/0346760 A1 * | 11/2017 | Kelly | H04L 67/1097 |

* cited by examiner

*Primary Examiner* — Sarai E Butler
(74) *Attorney, Agent, or Firm* — Eversheds Sutherland (US) LLP

(57) ABSTRACT

This disclosure describes systems, methods, and devices related to enhanced retry count for an uplink (UL) multi-user (MU) transmission. A device may identify a trigger frame received from a first device on a wireless communication channel. The device may determine a quality of service counter associated with an access category. The device may cause to send a frame to the first device based at least in part on the trigger frame. The device may determine an error condition associated with the frame. The device may refrain from incrementing the quality of service counter based on the error condition.

20 Claims, 8 Drawing Sheets

ENHANCED RETRY COUNT FOR UPLINK MULTI-USER TRANSMISSION

CROSS-REFERENCE TO RELATED APPLICATIONS

This application claims the benefit of U.S. Provisional Application No. 62/349,345 filed Jun. 13, 2016, the disclosure of which is incorporated herein by reference as if set forth in full.

TECHNICAL FIELD

This disclosure generally relates to systems and methods for wireless communications and, more particularly, to an enhanced retry count for uplink multi-user transmission.

BACKGROUND

Efficient use of the resources of a wireless local area network (WLAN) is important to provide bandwidth and acceptable response times to the users of the WLAN. However, often there are many devices trying to share the same resources, and some devices may be limited by the communication protocol they use or by their hardware bandwidth. Moreover, wireless devices may need to operate with both newer protocols and with legacy device protocols

BRIEF DESCRIPTION OF THE DRAWINGS

The present disclosure is illustrated by way of example and not limitation in the figures of the accompanying drawings, in which like references indicate similar elements and in which.

DESCRIPTION

Figure 1:
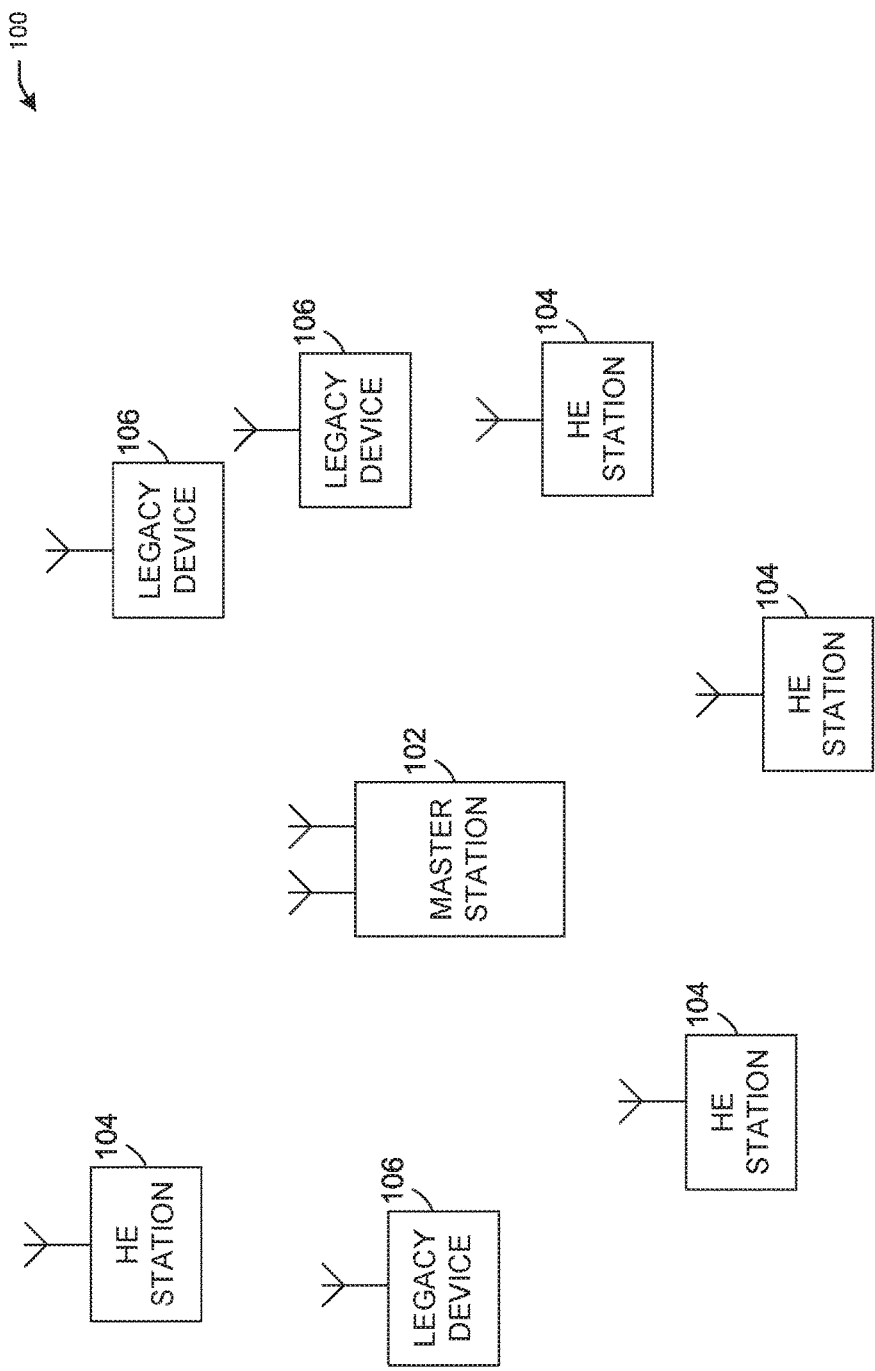
FIG. 1 illustrates a wireless local area network (WLAN), in accordance with one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A quality of service (QoS) design in IEEE 802.11ax includes associating packets with QoS values that are specific to access categories (ACs). In that case, channel access through contention involves assigning contention window (CW) values that are dependent on the AC in order to provide an advantage for higher priority frames (e.g., voice versus video). Currently, there are four ACs: voice (VO), video (VI), best effort (BE), and background (BK) for transmitting packets through medium access. In order to contend for access of a channel, for each AC, a station (STA) may determine a channel access delay that includes a random backoff timer that is associated with a contention window. The STA begins decrementing the random backoff timer by one for every slot time that passes.

If another STA begins transmitting before its timer has reached zero, the STA defers access until the medium is available again, at which time it continues decrementing the timer from where it previously left off. Once the timer reaches zero, the STA is allowed to transmit its frame. If a collision occurs, or due to noise, collisions, or interferences, no acknowledgment of the frame will be received by the STA, and the STA will increment its retry counter and increase its CW up to a maximum contention window (CWmax). The STA would then select a new random backoff timer between the value of 0 and CW, using the new CW range, and proceed as before. However, if the retry counter reaches the limit, the CW is reset to CWmin, and the retry counter is set to 0. Therefore, the STA will have a shorter channel access time during the next channel access attempt and will take precedence over other STAs. In effect, this may create an unintentional increase in priority to STAs that were triggered by the access point and had transmission failures.

In one embodiment, an enhanced retry count for an uplink (UL) multi-user (MU) transmission system may identify a trigger frame received from a device, such as an access point (AP) on a wireless communication channel. The AP may be in a multi-user multiple-input multiple-output (MU-MIMO) communication with multiple STAs. The AP may send a trigger frame to trigger data transmission from multiple STAs simultaneously using orthogonal frequency division multiple access (OFDMA) or MIMO.

In one embodiment, the enhanced retry count for the UL MU transmission system may cause to send a frame to the AP based at least in part on the trigger frame. However, the frame may fail to reach the AP due to an error condition such as noise, interference, collision, or any other conditions that may prevent the frame from reaching the AP. The STA would determine the error condition based on a failure to receive an acknowledgment from the AP after sending the frame to the AP.

In one embodiment, the enhanced retry count for the UL MU transmission system may determine the retry counters to be at least one of a quality of service short retry counter (QSRC), a quality of service long retry counter (QLRC), a quality of service long drop-eligible retry counter (QLDRC), or a quality of service short drop-eligible retry counter (QSDRC).

In one embodiment, the enhanced retry count for the UL MU transmission system may determine a retry counter limit, which may be determined based at least in part on the type of retry counter (e.g., QSRC, QLRC, QLDRC, or QSDRC). For example, the retry limit for QSRC is designated as dot11ShortRetryLimit, and the retry limit for the dot11ShortRetryLimit is designated as dot11LongRetryLimit based at least in part on IEEE 802.11 standards and may be determined by higher layers.

In one embodiment, the enhanced retry count for the UL MU transmission system may determine whether a dot11RobustAVStreamingImplemented value is set to true or false. The dot11RobustAVStreamingImplemented value may be determined by higher layers. If the dot11RobustAVStreamingImplemented value is determined to be false, then an STA may refrain from updating its retry counters (e.g., QSRC or QLRC) when the data transmission for the corresponding AC solicited by the AP through a trigger frame fails. If dot11RobustAVStreamingImplemented is true, then the STA may refrain from updating its retry counters (e.g., QSDRC, or QLDRC) when the data transmission for the corresponding AC solicited by the AP through the trigger frame fails. It is understood that the above descriptions are for purposes of illustration and are not meant to be limiting.

FIG. 1 illustrates a WLAN 100 in accordance with some embodiments. The WLAN 100 may comprise a basis service set (BSS) that may include a master station 102 which may be an AP, a plurality of high-efficiency (HE) (e.g., IEEE 802.11ax) stations 104, and a plurality of legacy (e.g., IEEE 802.11n/ac) devices 106.

The master station 102 may be an AP using one of the IEEE 802.11 protocols to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). The master station 102 and/or the HE station 104 may use one or both of MU-MIMO and OFDMA. There may be more than one master station 102 that is part of an extended service set (ESS). A controller (not illustrated) may store information that is common to the more than one master station 102. The controller may have access to an external network such as the Internet.

The legacy devices 106 may operate in accordance with one or more of IEEE 802.11 a/b/g/n/ac/ad/af/ah/aj, or another legacy wireless communication standard. The legacy devices 106 may be STAs or IEEE 802.11 STAs.

The HE stations 104 may be wireless transmit and receive devices such as cellular telephones, smart telephones, handheld wireless devices, wireless glasses, wireless watches, wireless personal devices, tablets, or another device that may be transmitting and receiving using the IEEE 802.11 protocol such as IEEE 802.11ax or another wireless protocol such as IEEE 802.11az. In some embodiments, the HE stations 104, the master station 102, and/or the legacy devices 106 may be termed wireless devices. In some embodiments, the HE station 104 may be a "group owner" (GO) for peer-to-peer modes of operation where the HE station 104 may perform some operations of a master station 102.

The master station 102 may communicate with the legacy devices 106 in accordance with legacy IEEE 802.11 communication techniques. In example embodiments, the master station 102 may also be configured to communicate with the HE stations 104 in accordance with legacy IEEE 802.11 communication techniques.

The HE stations 104, the master station 102, and/or the legacy devices 106 may be any addressable unit. It should be noted that any addressable unit may be a station (STA). An STA may take on multiple distinct characteristics, each of which shapes its function. For example, a single addressable unit might simultaneously be a portable STA, a quality-of-service (QoS) STA, a dependent STA, and a hidden STA. The HE stations 104, the master station 102, and/or the legacy devices 106 may be STAs. The HE stations 104, the master station 102, and/or the legacy devices 106 may operate as a personal basic service set (PBSS) control point/access point (PCP/AP). The HE stations 104, the master station 102, and/or the legacy devices 106 may include any suitable processor-driven device including, but not limited to, a mobile device or a non-mobile device, e.g., a static device. For example, the HE stations 104, the master station 102, and/or the legacy devices 106 may include a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc., may also be included in this list.

Any of the HE stations 104, the master station 102, and/or the legacy devices 106 may be configured to communicate with each other via one or more communications networks wirelessly or wired. The HE stations 104 and/or the legacy devices 106 may also communicate peer-to-peer or directly with each other with or without the master station 102. Any of the communications networks may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks may have any suitable communication range associated therewith and may include, for example, global networks (e.g., the Internet), metropolitan area networks (MANs), wide area networks (WANs), local area networks (LANs), or personal area networks (PANs). In addition, any of the communications networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the HE stations 104, the master station 102, and/or the legacy devices 106 may include one or more communications antennas. The one or more communications antennas may be any suitable type of antennas corresponding to the communications protocols used by the HE stations 104, the master station 102, and/or the legacy devices 106. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the HE stations 104, the master station 102, and/or the legacy devices 106.

MIMO beamforming in a wireless network may be accomplished using RF beamforming and/or digital beamforming. In some embodiments, in performing a given MIMO transmission, the HE stations 104, the master station 102, and/or the legacy devices 106 may be configured to use all or a subset of its one or more communications antennas to perform MIMO beamforming.

Any of the HE stations 104, the master station 102, and/or the legacy devices 106 may include any suitable radio and/or transceiver for transmitting and/or receiving radio frequency (RF) signals in the bandwidth and/or channels corresponding to the communications protocols utilized by any of the HE stations 104, the master station 102, and/or the legacy devices 106 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHz channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

Typically, when a medium access control (MAC) service data unit (MSDU) arrives from an upper layer to the MAC layer of a device, the MSDU may first be mapped to one of four defined ACs based at least in part on its user priority. These four ACs include, in descending priority order, a voice (VO) access category, a video (VI) access category, a best effort (BE) access category, and a background (BK) access category. The MSDU is then routed to a transmit queue corresponding to the AC to which the MSDU has been mapped. Each such transmit queue may have a corresponding enhanced distributed channel access (EDCA) function (EDCAF), which may define a backoff window size, an arbitration interframe space (AIFS), and a transmission opportunity (TXOP) length for all MSDUs in the corresponding AC. An internal collision resolution scheme may resolve conflicts between the EDCAFs of different queues, and may, for example, allow an MSDU from a higher-priority queue to access the channel and defer an MSDU from a lower-priority queue when the two queues have backoff timers that expire at substantially the same time.

In example embodiments, the HE station 104 and/or the master station 102 are configured to perform the methods and operations herein described in conjunction with FIGS. 1-6.

In some embodiments, an HE frame may be configurable to have the same bandwidth as a channel. The bandwidth of a channel may be 20 MHz, 40 MHz, 80 MHz, 160 MHz, or 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 5 MHz and 10 MHz, or a combination thereof. Another bandwidth that is less or equal to the available bandwidth may also be used. In some embodiments, the bandwidth of the channels may be based on a number of active subcarriers. In some embodiments the bandwidth of the channels are multiples of 26 (e.g., 26, 52, 104, etc.) active subcarriers or tones that are spaced by 20 MHz. In some embodiments, the bandwidth of the channels are 26, 52, 104, 242, etc., active data subcarriers or tones that are spaced 20 MHz apart. In some embodiments, the bandwidth of the channels is 256 tones spaced by 20 MHz. In some embodiments, a 20 MHz channel may comprise 256 tones for a 256 point Fast Fourier Transform (FFT). In some embodiments, a different number of tones are used.

An HE frame may be configured for transmitting a number of spatial streams, which may be in accordance with MU-MIMO.

In some embodiments, an HE frame may be configured for transmitting in accordance with one or both of OFDMA and MU-MIMO. In other embodiments, the master station 102, the HE station 104, and/or the legacy device 106 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile Communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, WiMAX, WiGig, or other technologies.

Some embodiments relate to HE communications. In accordance with some IEEE 802.11ax embodiments, a master station 102 may operate as a master station which may be arranged to contend for a wireless medium (e.g., during a contention period) to receive exclusive control of the medium for an HE control period. In some embodiments, the HE control period may be termed a transmission opportunity (TXOP). The master station 102 may transmit an HE master-sync transmission, which may be a trigger frame or HE control, and schedule transmission at the beginning of the HE control period. The master station 102 may transmit a time duration of the TXOP and channel information. During the HE control period, the HE stations 104 may communicate with the master station 102 in accordance with a non-contention-based multiple access technique such as OFDMA and/or MU-MIMO. This is unlike conventional WLAN communications in which devices communicate in accordance with a contention-based communication technique, rather than a multiple access technique. During the HE control period, the master station 102 may communicate with the HE stations 104 using one or more HE frames. During the HE control period, the HE stations 104 may operate on a channel smaller than the operating range of the master station 102. During the HE control period, legacy stations refrain from communicating.

In accordance with some embodiments, during the master-sync transmission, the HE stations 104 may contend for the wireless medium with the legacy devices 106 being excluded from contending for the wireless medium during the master-sync transmission or TXOP. In some embodiments, the trigger frame may indicate an uplink (UL) UL MU-MIMO and/or a UL OFDMA control period. In some embodiments, the trigger frame may indicate portions of the TXOP that are contention based for some HE stations 104 and portions that are not contention based.

In some embodiments, the multiple access technique used during the HE control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

Figure 2:
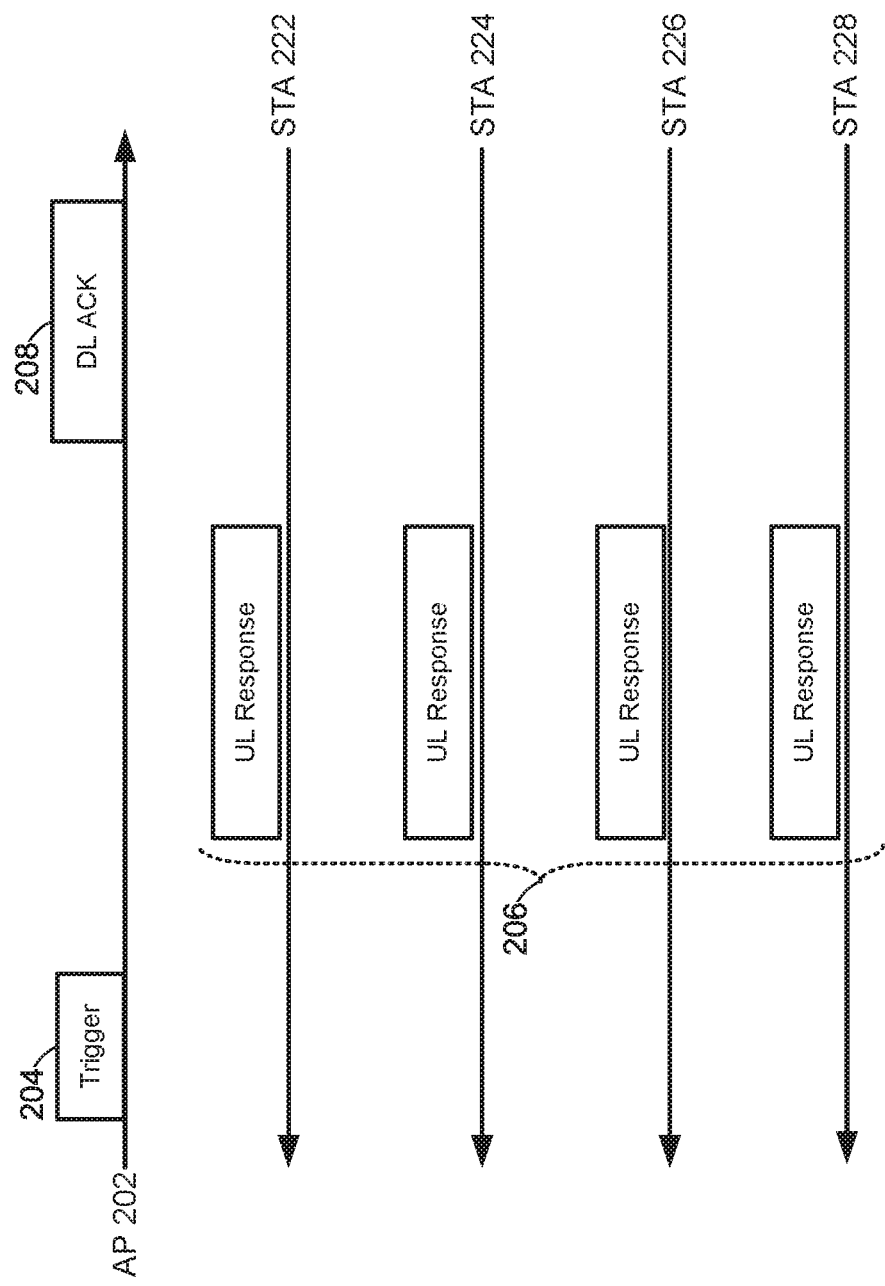
FIG. 2 illustrates a schematic diagram of uplink (UL) multi-user (MU) transmissions, in accordance with one or more example embodiments of the present disclosure.

FIG. 2 illustrates a schematic diagram of UL MU transmissions, in accordance with one or more example embodiments of the present disclosure.

Referring to FIG. 2, there is shown an AP 202 in an MU-MIMO communication between an AP 202 and four STAs (e.g., STAs 222, 224, 226 and 228).

In one embodiment, an enhanced retry count for the UL MU transmission system may include a trigger based UL MU transmission, which may be in accordance with IEEE 802.11ax. Specifically, the AP 202 may send a trigger frame 204 to trigger data transmission from multiple STAs (e.g., STAs 222, 224, 226 and 228) simultaneously using OFDMA or MIMO. It should be understood that a UL MU transmission is a many to one transmission capability. For example, the AP 202 may solicit simultaneous transmission from multiple devices with Wi-Fi capability (e.g., mobile devices, such as phones, tablets, laptops, IoT devices such as refrigerators, thermostats, etc.) simultaneously with the UL MU transmission in accordance with the enhanced retry count for the UL MU transmission system. In this way, transmissions from multiple STAs can reach the AP efficiently and with fairness to other stations that may be contending to access the communication channel.

It should be understood that in order to accommodate the simultaneous transmission from multiple STAs, a new physical layer (PHY) format, called HE trigger based PPDU is introduced by IEEE 802.11ax that triggers an STA to transmit data in response to the trigger frame 204. A QoS design in IEEE 802.11ax includes creating QoS values that are specific to access categories. In that case, channel access through contention involves assigning contention window values that are dependent on the access category in order to provide an advantage for higher priority frames (e.g., voice versus video).

Currently, for a QoS STA, if after the reception of the trigger frame, the QoS STA attempts to transmit its data to the AP and the transmission fails, then the QoS STA will update one or more retry counters. The retry counters may include at least one of a quality of service short retry counter (QSRC), a quality of service long retry counter (QLRC), a quality of service long drop-eligible retry counter (QLDRC), or a quality of service short drop-eligible retry counter (QSDRC). Each of these retry counters is associated with an AC (e.g., QSRC[AC], QLRC[AC], etc.). Consequently, the QoS STA will update, for example, its QSRC[AC] or QLRC[AC] counters if the transmission triggered by the trigger frame from the AP fails. Each time the QoS STA tries to retransmit the transmission and a failure occurs, a retry counter is incremented by 1 until the counter reaches a threshold. For example, the QoS STA increments its QSRC every time a transmission of an A-MPDU or a frame in a PSDU of length less than or equal to a threshold fails. According to the IEEE 802.11 standards, this threshold is designated as dot11RTSThreshold. Further, the QoS STA increments its QLRC every time a transmission of an A-MPDU or a frame in a PSDU of length greater than or equal to dot11RTSThreshold fails.

However, when QSRC[AC] or QLRC[AC] reaches a retry limit, CWmin[AC] will be set to 0. The retry limit for QSRC is designated as dot11ShortRetryLimit, and the retry limit for the dot11ShortRetryLimit is designated as dot11LongRetryLimit based at least in part on IEEE 802.11 standards and may be determined by higher layers. For example, a default of dot11 ShortRetryLimit may be 7, and the default value of dot11LongRetryLimit may be 4. Therefore, when the transmissions fail in response to the trigger frame from the AP in the UL MU transmissions, after the AP finishes its TXOP, the STA may now have reset a value associated with its contention window, CWmin, to be 0, when it contends for channel access in the next TXOP or its own single user channel access. However, other STAs may have also had transmission failures but have not reached the limit yet. This will create unfairness between the STAs that are triggered by the AP for transmission and the STAs that are not triggered by the AP for transmission because all of the devices that were triggered by the AP and experienced transmission failures and that reached the retry limit will have a shorter contention window to start with. Therefore, these advantaged STAs will have a shorter channel access time and will take precedence over the other STAs. In effect, this may create an unintentional increased priority to devices that were triggered by the AP in comparison to other STAs.

Typically, a downlink (DL) acknowledgment (e.g., DL ACK 208) may be sent to the one or more STAs involved in the MU-MIMO group during communication between them. The DL acknowledgment indicates to the STA that the UL response 206 has been received by the AP 202. In case the STA does not receive a DL acknowledgment, the STA may determine that the UL response has failed to reach the AP 202. Typically, the retry counters are incremented.

In one embodiment, an STA (e.g., STA 222) may determine to refrain from updating its retry counters when the data transmission for the corresponding AC solicited by the AP through the trigger frame 204 fails. It is understood that the above descriptions are for purposes of illustration and are not meant to be limiting.

Figure 3:
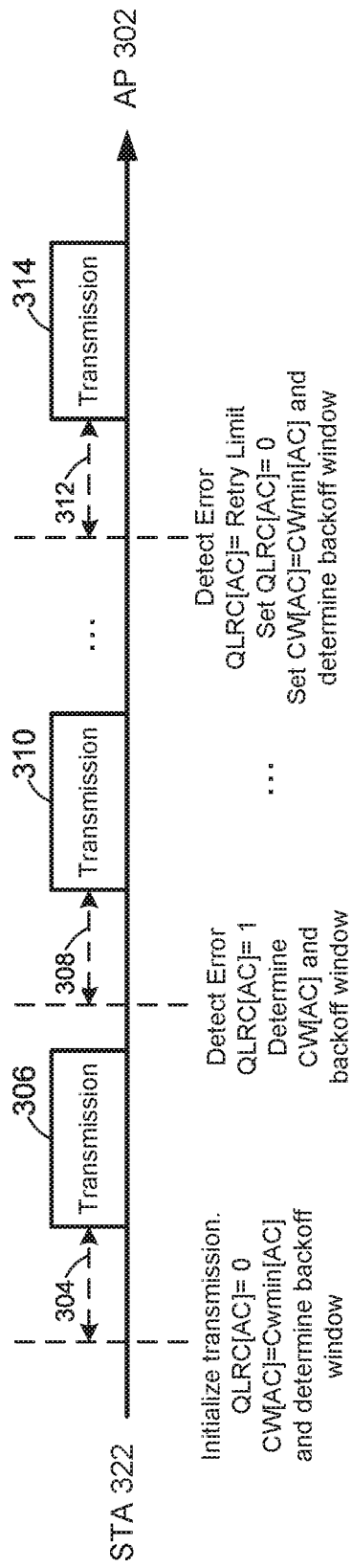
FIG. 3 illustrates a schematic diagram of transmission error detection and a retry counter, in accordance with one or more example embodiments of the present disclosure.

FIG. 3 illustrates a schematic diagram of transmission error detection and a retry counter, in accordance with one or more example embodiments of the present disclosure.

Referring to FIG. 3, there is shown an STA (e.g., STA 322) that is contending for channel access in order to transmit to the AP (e.g., AP 302). In this case, the STA 322 may have been allocated a TXOP to attempt transmissions to its intended recipient, the AP 302. In this example, the STA 322 may be a QoS having a specific AC category assigned to its transmissions (e.g., VO, VI, BE, or BK).

Typically, a QoS STA may transmit on a channel after a channel access delay (e.g., channel access delay 304) and while the channel is available in order to avoid collisions with existing transmissions. The channel access delay may include a backoff counter associated with a backoff window. The backoff window may be based on a contention window (CW) that may be associated with the AC. The five parameters that may be used to determine the backoff window include at least in part a CWmin[AC], a CWmax[AC], a CW[AC], a backoff counter, and a retry counter. It should be noted that there is a short retry counter and a long retry counter for the corresponding AC depending on the length of the transmission. For simplicity, the following procedure shows how the retry counter is used. Initially, the CW[AC] is set to CWmin[AC], and the retry counter is set to zero. When the STA 322 wants to attempt a transmission (e.g., transmission 306), the AP 302 may determine a backoff counter where the backoff counter is randomly drawn from any value between zero and CW. The value of the backoff counter represents the number of slots that an STA needs to sense that the medium (e.g., communication channel) is idle before sending its transmission 306. If the transmission 306 fails, the respective retry counter is incremented by 1. In that case, the process repeats where the STA 322 attempts another transmission 310 after a channel access delay 308 and by retrying another random backoff counter value.

However, if the retry counter does not hit the limit, the CW[AC] is updated as follows: if CW[AC] is less than CWmax[AC], CW[AC] is set to the value (CW[AC]+1)× 2−1. If CW[AC] is equal to CWmax[AC], CW[AC] is left unchanged.

Again, the process repeats where the STA 322 attempts another transmission 310, after a channel access delay 308, and by redrawing another random backoff counter value. In the example of FIG. 3, the STA 322 may detect that the transmission 310 failed because it did not receive an acknowledgment from the AP 302. In this case, the STA 322 may update its retry counter, which may have reached the retry limit. When the retry counter hits the limit, then the CW[AC] is reset to CWmin[AC], and the retry counter is set to 0. Therefore, when the STA 322 attempts another transmission 314, the STA 322 may have a shorter backoff window because the CW[AC] has been reset to CWmin[AC]. Therefore, the STA 322 will have a shorter channel access time (e.g., channel access delay 312) during the next channel access attempt and will take precedence over other STAs. In effect, this may create an unintentional increase in priority to STAs that were triggered by the AP and had transmission failures.

Figure 4:
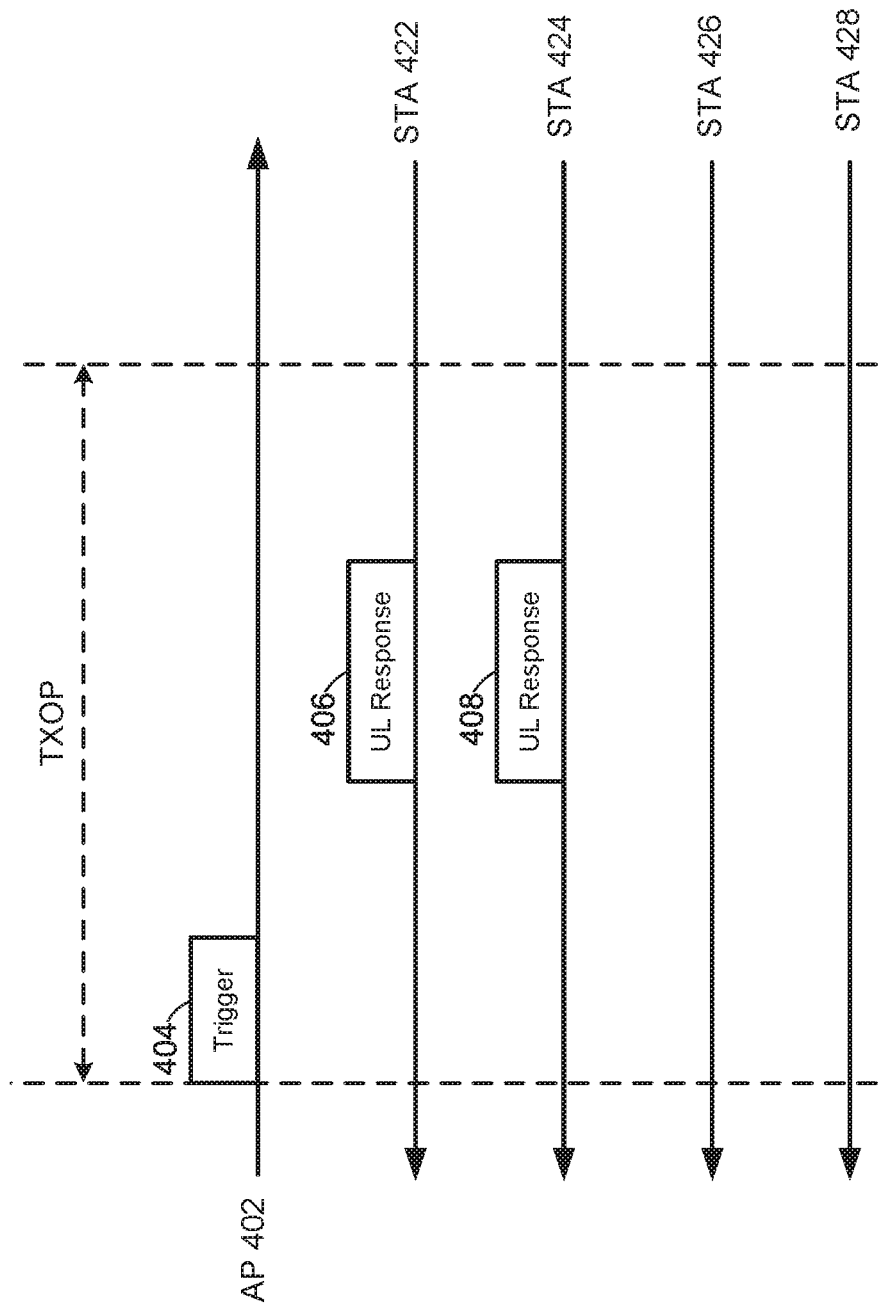
FIG. 4 illustrates a schematic diagram of an enhanced retry count for a UL MU transmission system, in accordance with one or more example embodiments of the present disclosure.

FIG. 4 illustrates a schematic diagram of an enhanced retry count for a UL MU transmission system, in accordance with one or more example embodiments of the present disclosure.

Referring to FIG. 4, there is shown an AP 402 that may be in an MU-MIMO communication with two STAs (e.g., STAs 422 and 424) in an MU-MIMO group. STAs 426 and 428 may not be included in that MU-MIMO group. The AP 402 may send a trigger frame 404 to STAs 422 and 424 soliciting responses. The trigger frame 404 may include information indicating to the STAs to send any UL responses (e.g., UL responses 406 and 408) and may include information associated with the TXOP assigned to the AP 402.

In the example of FIG. 4, it is assumed that the four STAs have had transmission failures and that they have reached a retry counter value that is close to the limit. For example, in order to illustrate the effect of hitting the retry counter limit, it is assumed that the four STAs have a QLRC[AC]=retry limit−1. That is one more transmission failure by any of these STAs will result in their respective counter to reach the retry limit.

In one embodiment, the STA 422 and the STA 424 may detect an error in their respective transmissions of UL responses 406 and 408. This means that the retry counters of the STA 422 and the STA 424 will hit the retry limit. Typically, as explained above, when the retry counter associated with an STA hits the limit, the CW[AC] is reset to CWmin[AC], the retry counter (e.g., QLRC) is reset to zero, and a new backoff window is determined based on these new values. This makes the backoff window smaller than the other backoff windows of other STAs making it unfair for the other STAs (e.g., unsolicited STAs). With reference to FIG. 4, if that was the case then the STAs 422 and 424 may have an advantage for hitting the retry limit when the error was detected. This is because the STA 422 and the STA 424, at the end of the TXOP of the AP, may be intended for the channel with a shorter backoff window than the STAs 426 and 428, which were not solicited by the trigger frame 404 from the AP 402 during the MU-MIMO communication.

In one embodiment, an enhanced retry count for the UL MU transmission system may facilitate, that is if an HE STA does not successfully receive the corresponding acknowledgment frame in response to the MPDU sent in an HE trigger based PPDU, the short retry counters and the long retry counters for the associated EDCAF are not incremented or changed. That is, the enhanced retry count for the UL MU transmission system may restrict the STAs that are solicited by a trigger frame for data transmission from updating QSRC[AC] or QLRC[AC] so that CWmin[AC] will not be updated due to a failure that happened in the TXOP initiated by the AP to solicit the UL MU transmission. This restriction may prevent the STA from updating CWmin earlier than the STAs that are not solicited by the trigger frame for transmission. For example, the STAs 422 and 424 may be restricted from incrementing their retry counters, which in this case are close to the retry limit, when an error condition is detected after their respective UL response (e.g., UL responses 406 or 408). Consequently, when the STA 422 and/or the STA 424 detects an error, they will refrain from updating their respective retry counters during the TXOP allocated to the AP 402. This will result in the STA 422 and the STA 424 continuing to contend for the channel after the passage of the TXOP allocated to the AP 402. It should be noted that it is possible that only some STAs are IEEE 802.11ax STAs, and other STAs are not IEEE 802.11ax STAs. Hence, the IEEE 802.11ax STAs can increase their respective retry counters more frequently and therefore can hit the retry limit earlier than the non-IEEE 802.11ax STAs (or STAs not solicited by the AP during an MU-MIMO communication) with the same medium condition. As a result, IEEE 802.11ax STAs may update CW to CWmin more often, and this will lead to unfairness to the non-IEEE 802.11ax STAs (or STAs not solicited by the AP during an MU-MIMO communication).

In one embodiment, with regard to a QoS STA, if dot11RobustAVStreamingImplemented is false, then a QoS STA cannot update QSRC[AC] or QLRC[AC] when the data transmission for corresponding access categories (AC) solicited by the AP through the trigger frame fails. If dot11RobustAVStreamingImplemented is true, then a QoS STA cannot update the QoS short drop-eligible retry counter (QSDRC)[AC] or the QoS long drop-eligible retry counter (QLDRC)[AC] when the data transmission for the corresponding AC solicited by the AP through the trigger frame fails.

In example embodiments, in regard to non-QoS STAs, an STA cannot update the station short retry count (SSRC) or the station long retry count (SLRC) when the data transmission solicited by the AP through the trigger frame fails.

In example embodiments, for an MSDU without a block acknowledgment agreement, an STA can be allowed to update its respective retry counters associated with each MSDU so that the STA could still drop packets when the retry count for each packet is reached. For example, a QoS STA can maintain a short retry counter and a long retry counter for each MAC Service Data Unit (MSDU), Aggregated MAC Service Data Unit (A-MSDU), or MAC Management Protocol Data Unit (MMPDU) that belongs to a traffic category (TC) that requires acknowledgment. The short retry count for an MSDU or an A-MSDU that is not part of a block acknowledgment agreement or for an MMPDU can be incremented every time transmission of a frame in a PSDU of length less than or equal to dot11RTSThreshold fails for that MSDU, A-MSDU, or MMPDU. The long retry count for an MSDU or an A-MSDU that is not part of a block acknowledgment agreement or for an MMPDU can be incremented every time transmission of an MAC frame in a PSDU of length greater than dot11RTSThreshold fails for that MSDU, A-MSDU, or MMPDU. Retries for failed transmission attempts can continue until one or more of the following conditions occurs: (a) the short retry count for the MSDU, A-MSDU, or MMPDU is equal to dot11ShortRetryLimit; or (b) the long retry count for the MSDU, A-MSDU, or MMPDU is equal to dot11LongRetryLimit.

In example embodiments, for an MSDU with a block acknowledgment agreement, it may not be necessary to consider the individual retry count because it is subject to the MSDU's lifetime. MSDUs that are sent using the block acknowledgment mechanism are not subject to retry limits but only to the MSDU's lifetime.

Figure 5:
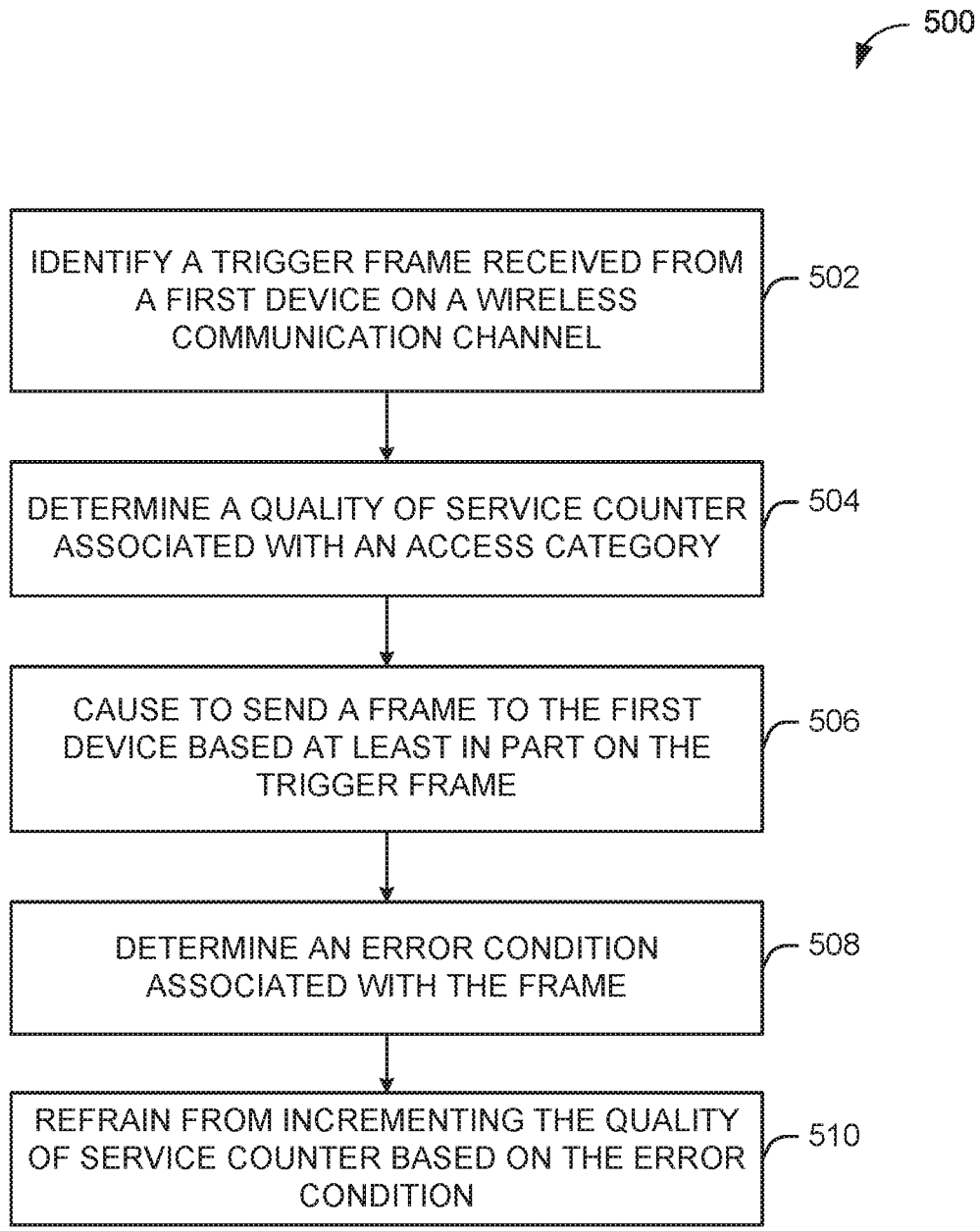
FIG. 5 illustrates a flow diagram of an illustrative process for an enhanced retry count for a UL MU transmission system, in accordance with one or more example embodiments of the present disclosure.

FIG. 5 illustrates a flow diagram of an illustrative process 500 for an illustrative enhanced retry count for a UL MU transmission system, in accordance with one or more example embodiments of the present disclosure.

At block 502, a device may identify a trigger frame received from a first device on a wireless communication channel. For example, a trigger frame may be received from a device, such as an access point (AP) on a wireless communication channel. The AP may be in an MU-MIMO communication with multiple STAs. The AP may send a trigger frame to trigger data transmission from multiple STAs simultaneously using orthogonal frequency division multiple access (OFDMA) or MIMO.

At block 504, the device may determine a quality of service counter associated with an access category. For example, the retry counters may be at least one of a quality of service short retry counter (QSRC), a quality of service long retry counter (QLRC), a quality of service long drop-eligible retry counter (QLDRC), or a quality of service short drop-eligible retry counter (QSDRC).

At block 506, the device may cause to send a frame to the AP based at least in part on the trigger frame. However, the frame may fail to reach the AP due to an error condition such as noise, interference, collision, or any other conditions that may prevent the frame from reaching the AP. The STA would determine the error condition based on a failure to receive an acknowledgment from the AP after sending the frame to the AP.

At block 508, the device may determine an error condition associated with the frame. For example, the device may determine a retry counter limit, which may be determined based at least in part on the type of retry counter (e.g., QSRC, QLRC, QLDRC, or QSDRC). For example, the retry limit for QSRC is designated as dot11ShortRetryLimit, and the retry limit for the dot11ShortRetryLimit is designated as dot11LongRetryLimit based at least in part on IEEE 802.11 standards and may be determined by higher layers. The error condition may be associated with collisions, noise, or interferences. In that case, no acknowledgment of the frame will be received by the STA, and the STA will increment its retry counter and increase its CW up to a maximum contention window (CWmax).

At block 510, the device may refrain from incrementing the quality of service counter based on the error condition. For example, the device may determine whether a dot11RobustAVStreamingImplemented value is set to true or false. The dot11RobustAVStreamingImplemented value may be determined by higher layers. If the dot11RobustAVStreamingImplemented value is determined to be false, then an STA may refrain from updating its retry counters (e.g., QSRC or QLRC) when the data transmission for the corresponding AC solicited by the AP through the trigger frame fails. If dot11RobustAVStreamingImplemented is true, then the STA may refrain from updating its retry counters (e.g., QSDRC, or QLDRC) when the data transmission for the corresponding AC solicited by the AP through the trigger frame fails. It is understood that the above descriptions are for purposes of illustration and are not meant to be limiting.

Figure 6:
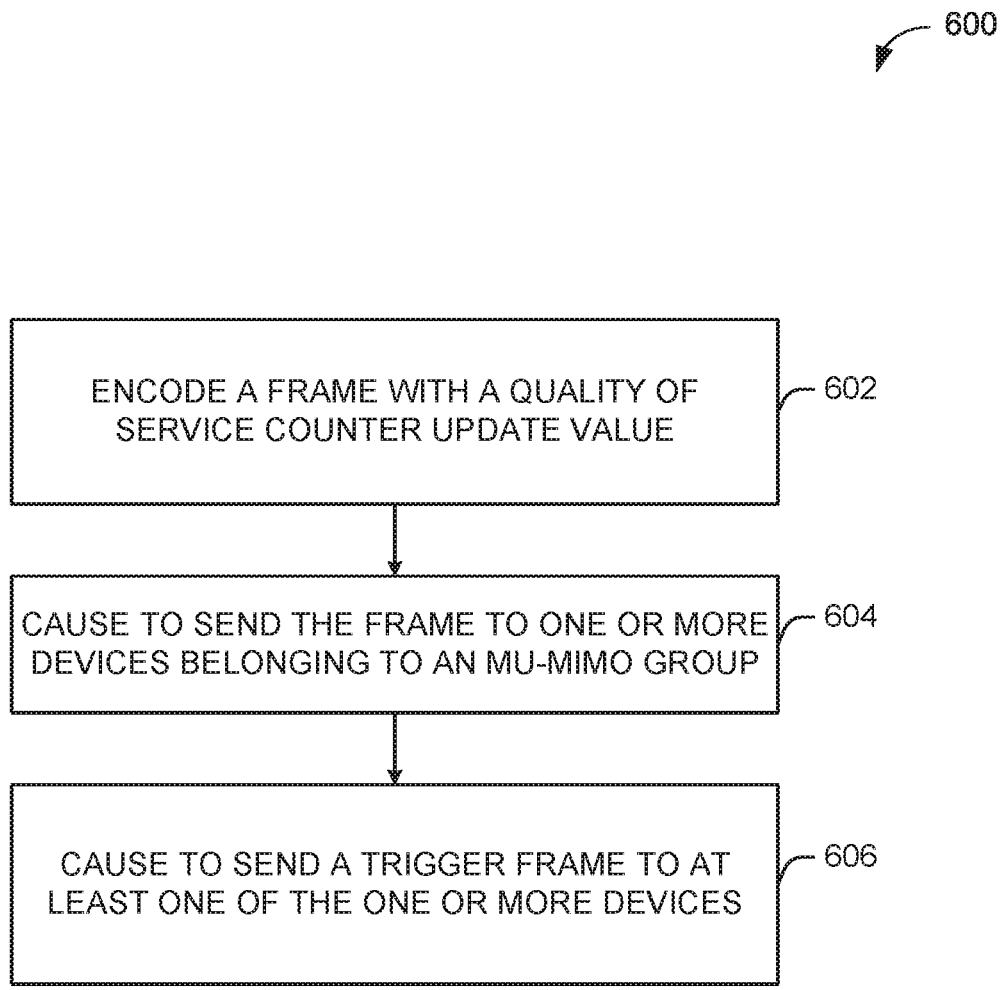
FIG. 6 illustrates a flow diagram of an illustrative process for an enhanced retry count for a UL MU transmission system, in accordance with one or more example embodiments of the present disclosure.

FIG. 6 illustrates a flow diagram of an illustrative process 600 for an enhanced retry count for a UL MU transmission system, in accordance with one or more example embodiments of the present disclosure.

At block 602, a device may encode a frame with a quality of service counter update value. In an MU-MIMO communication between an AP and one or more STAs belonging to the same MU-MIMO group, the AP may indicate to the STAs of the MU-MIMO group to determine how and when to update their retry counters. For example, the AP may determine a quality of service counter update value that indicates to the receiving devices that these devices should refrain from updating their quality of service counters when a transmission error is detected by these devices.

At block 604, the device may cause to send the frame to one or more devices belonging to an MU-MIMO group. For example, the AP may send the frame that includes the quality of service counter update value, which may be set such that these devices belonging to the MU-MIMO group should refrain from updating their retry counters. When the STAs of the MU-MIMO group receive the frame, they may decode or otherwise retrieve the information associated with the quality of service counter update value. Based on that value, the receiving STAs may determine to refrain (or increment) their respective retry counters.

At block 606, the device may cause to send a trigger frame to at least one of the one or more devices. For example, an STA may determine a retry counter limit, which may be determined based at least in part on the type of retry counter (e.g., QSRC, QLRC, QLDRC, or QSDRC). For example, the retry limit for QSRC is designated as dot11ShortRetryLimit, and the retry limit for the dot11ShortRetryLimit is designated as dot11LongRetryLimit based at least in part on IEEE 802.11 standards and may be determined by higher layers. The device may determine whether a dot11RobustAVStreamingImplemented value is set to true or false. The dot11RobustAVStreamingImplemented value may be determined by higher layers. If the dot11RobustAVStreamingImplemented value is determined to be false, then an STA may refrain from updating its retry counters (e.g., QSRC or QLRC) when the data transmission for the corresponding AC solicited by the AP through a trigger frame fails. If dot11RobustAVStreamingImplemented is true, then the STA may refrain from updating its retry counters (e.g., QSDRC, or QLDRC) when the data transmission for the corresponding AC solicited by the AP through the trigger frame fails. It is understood that the above descriptions are for purposes of illustration and are not meant to be limiting.

Figure 7:
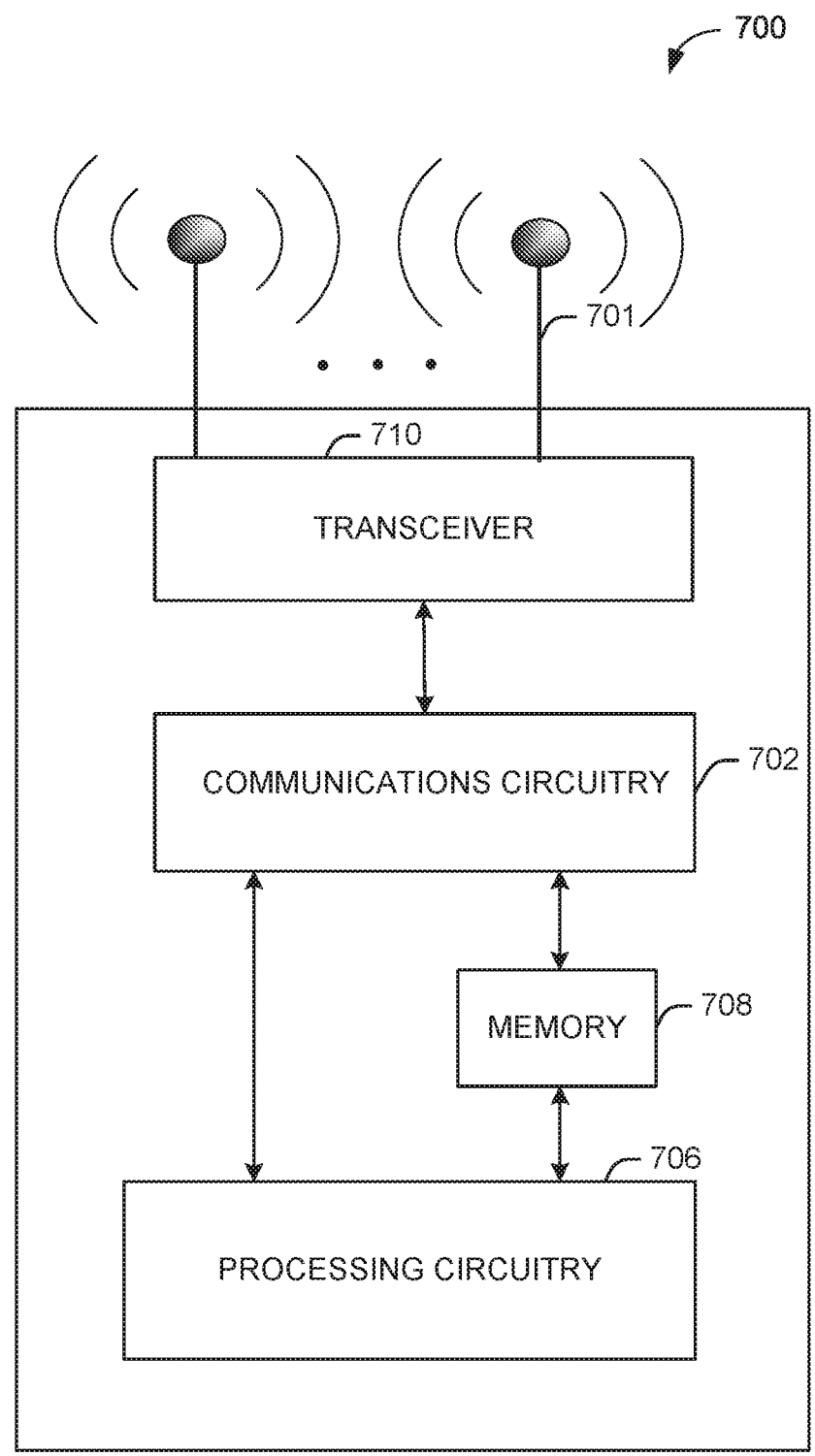
FIG. 7 illustrates a functional diagram of an example communication station that may be suitable for use as a user device, in accordance with one or more example embodiments of the present disclosure.

FIG. 7 shows a functional diagram of an exemplary communication station 700 in accordance with some embodiments. In one embodiment, FIG. 7 illustrates a functional block diagram of a communication station that may be suitable for use as a master station 102 or an HE station 104 of FIG. 1, in accordance with some embodiments. The communication station 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer (PHY) communications and/or media access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in FIGS. 1-6.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device memory.

Figure 8:
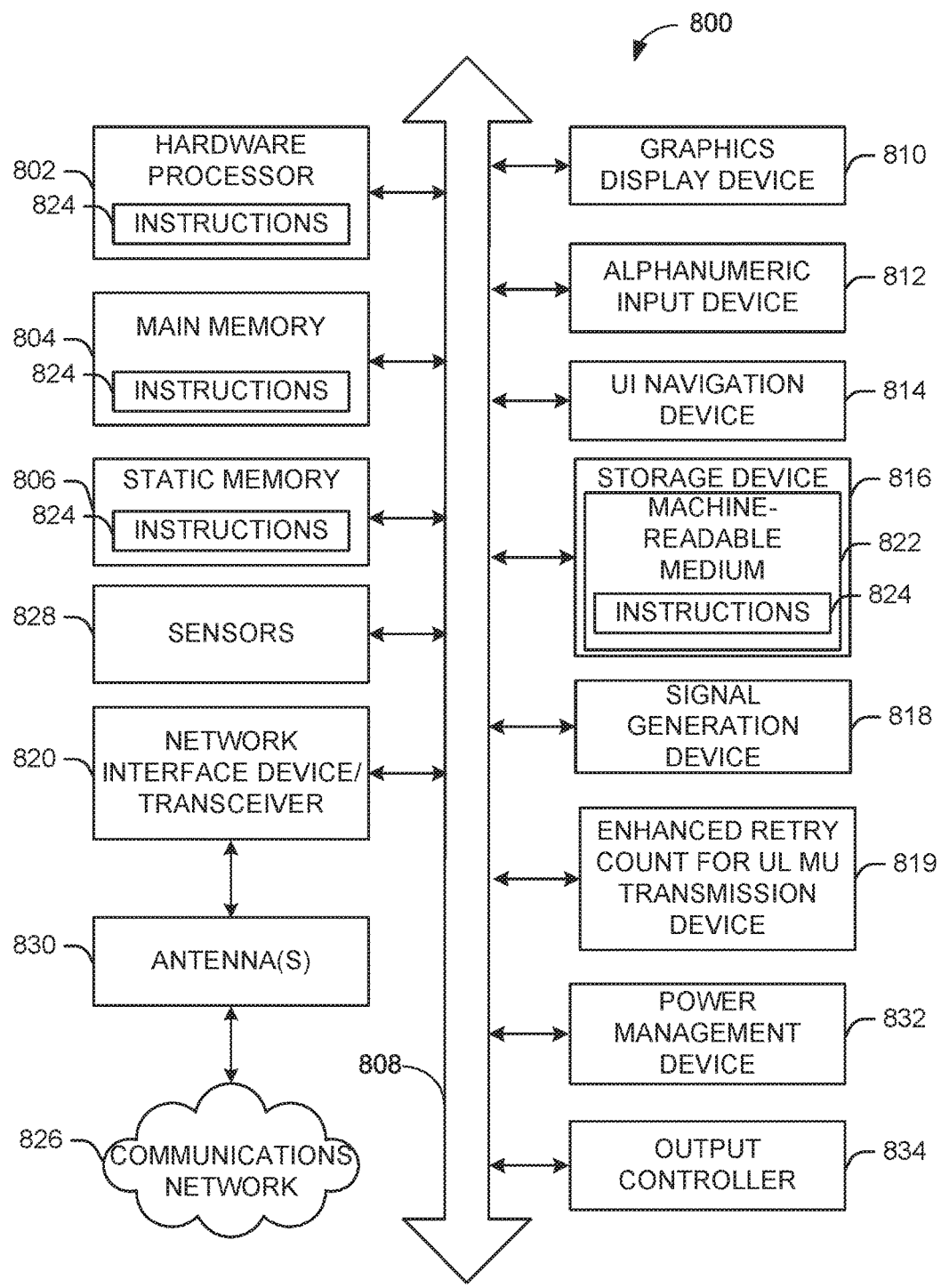
FIG. 8 illustrates a block diagram of an example machine upon which any of one or more techniques (e.g., methods) may be performed, in accordance with one or more example embodiments of the present disclosure.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be The machine 800 may be a master station 102, HE station 104, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), an enhanced retry count for UL MU transmission device 819, a network interface device/transceiver 820 coupled to antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The enhanced retry count for UL MU transmission device 819 may carry out or perform any of the operations and processes (e.g., processes 500 and 600) described and shown above. For example, the enhanced retry count for UL MU transmission device 819 may identify a trigger frame received from a device, such as an AP on a wireless communication channel. The AP may be in an MU-MIMO communication with multiple STAs. The AP may send a trigger frame to trigger data transmission from multiple STAs simultaneously using OFDMA or MIMO.

The enhanced retry count for UL MU transmission device 819 may cause to send a frame to the AP based at least in part on the trigger frame. However, the frame may fail to reach the AP due to an error condition such as noise, interference, collision, or any other conditions that may prevent the frame from reaching the AP. The STA would determine the error condition based on a failure to receive an acknowledgment from the AP after sending the frame to the AP.

The enhanced retry count for UL MU transmission device 819 may determine the retry counters to be at least one of a quality of service short retry counter (QSRC), a quality of service long retry counter (QLRC), a quality of service long drop-eligible retry counter (QLDRC), or a quality of service short drop-eligible retry counter (QSDRC).

The enhanced retry count for UL MU transmission device 819 may determine a retry counter limit, which may be determined based at least in part on the type of retry counter (e.g., QSRC, QLRC, QLDRC, or QSDRC). For example, the retry limit for QSRC is designated as dot11ShortRetryLimit, and the retry limit for the dot11ShortRetryLimit is designated as dot11LongRetryLimit based at least in part on IEEE 802.11 standards and may be determined by higher layers.

The enhanced retry count for UL MU transmission device 819 may determine whether a dot11RobustAVStreamingImplemented value is set to true or false. The dot11RobustAVStreamingImplemented value may be determined by higher layers. If the dot11RobustAVStreamingImplemented value is determined to be false, then an STA may refrain from updating its retry counters (e.g., QSRC or QLRC) when the data transmission for the corresponding AC solicited by the AP through the trigger frame fails. If dot11RobustAVStreamingImplemented is true, then the STA may refrain from updating its retry counters (e.g., QSDRC, or QLDRC) when the data transmission for the corresponding AC solicited by the AP through a trigger frame fails. It is understood that the above descriptions are for purposes of illustration and are not meant to be limiting.

It is understood that the above are only a subset of what the enhanced retry count for UL MU transmission device 819 may be configured to perform and that other functions included throughout this disclosure may also be performed by the enhanced retry count for UL MU transmission device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

According to example embodiments of the disclosure, there may be a device. The device may include memory and processing circuitry configured to identify a trigger frame received from a first device on a wireless communication channel. The memory and processing circuitry may be further configured to determine a quality of service counter associated with an access category. The memory and processing circuitry may be further configured to cause to send a frame to the first device based at least in part on the trigger frame. The memory and processing circuitry may be further configured to determine an error condition associated with the frame. The memory and processing circuitry may be further configured to refrain from incrementing the quality of service counter based on the error condition.

The implementations may include one or more of the following features. The error condition may include a failure to receive an acknowledgment from the first device after causing to send the frame. The trigger frame is associated with a transmission duration. The quality of service counter is at least one of a quality of service short retry counter (QSRC), a quality of service long retry counter (QLRC), a quality of service long drop-eligible retry counter (QLDRC), or a quality of service short drop-eligible retry counter (QSDRC). The memory and the processing circuitry may be further configured to determine a predetermined value is set to false, wherein the quality of service counter is a quality of service short retry counter (QSRC) or a quality of service long retry counter (QLRC). The memory and processing circuitry may be further configured to refrain from incrementing the quality of service counter. The memory and the processing circuitry may be further configured to determine a predetermined value is set to true, wherein the quality of service counter is a quality of service short drop-eligible retry counter (QSDRC) or a quality of service long drop-eligible retry counter (QLDRC). The memory and processing circuitry may be further configured to refrain from incrementing the quality of service counter. The access category is at least one of a voice category, a video category, a best effort category, or a background category. The memory and the processing circuitry may be further configured to cause to delay sending the frame on the wireless communication channel by a time delay based at least in part on a backoff window. The backoff window is based on a contention window associated with the access category. The device may further include a transceiver configured to transmit and receive wireless signals. The device may further include one or more antennas coupled to the transceiver.

According to example embodiments of the disclosure, there may be a device. The device may include memory and processing circuitry configured to encode a frame with a quality of service counter update value. The memory and processing circuitry may be further configured to cause to send the frame to one or more devices belonging to a multiuser multiple input and multiple output (MU-MIMO) group. The memory and processing circuitry may be further configured to cause to send a trigger frame to at least one of the one or more devices.

The implementations may include one or more of the following features. The memory and the processing circuitry may be further configured to determine an error condition associated with at least one data frame from the at least one of the one or more devices. The quality of service counter update value indicates to the at least one of the one or more devices to refrain from updating its quality of service counter when a transmission error is detected by the at least one of the one or more devices. The quality of service counter is at least one of a quality of service short retry counter (QSRC), a quality of service long retry counter (QLRC), a quality of service long drop-eligible retry counter (QLDRC), or a quality of service short drop-eligible retry counter (QSDRC).

According to example embodiments of the disclosure, there may be a non-transitory computer-readable medium storing computer-executable instructions which, when executed by a processor, cause the processor to perform operations. The operations may include encoding a frame with a quality of service counter update value. The operations may include causing to send the frame to one or more devices belonging to a multiuser multiple input and multiple output (MU-MIMO) group. The operations may include causing to send a trigger frame to at least one of the one or more devices.

The implementations may include one or more of the following features. The operations further may include determining an error condition associated with at least one data frame from the at least one of the one or more devices. The quality of service counter update value indicates to the at least one of the one or more devices to refrain from updating its quality of service counter when a transmission error is detected by the at least one of the one or more devices. The quality of service counter is at least one of a quality of service short retry counter (QSRC), a quality of service long retry counter (QLRC), a quality of service long drop-eligible retry counter (QLDRC), or a quality of service short drop-eligible retry counter (QSDRC).

According to example embodiments of the disclosure, there may be a non-transitory computer-readable medium storing computer-executable instructions which, when executed by a processor, cause the processor to perform operations. The operations may include identifying, by one or more processors, a trigger frame received from a first device on a wireless communication channel. The operations may include determining a quality of service counter associated with an access category. The operations may include causing to send a frame to the first device based at least in part on the trigger frame. The operations may include determining an error condition associated with the frame. The operations may include refraining from incrementing the quality of service counter based on the error condition.

The implementations may include one or more of the following features. The error condition may include a failure to receive an acknowledgment from the first device after causing to send the frame. The quality of service counter is at least one of a quality of service short retry counter (QSRC), a quality of service long retry counter (QLRC), a quality of service long drop-eligible retry counter (QLDRC), or a quality of service short drop-eligible retry counter (QSDRC). The operations may include determining a predetermined value is set to false, wherein the quality of service counter is a quality of service short retry counter (QSRC) or a quality of service long retry counter (QLRC). The operations may include refraining from incrementing the quality of service counter. The operations may include determining a predetermined value is set to true, wherein the quality of service counter is a quality of service short drop-eligible retry counter (QSDRC) or a quality of service long drop-eligible retry counter (QLDRC). The operations may include refraining from incrementing the quality of service counter. The access category is at least one of a voice category, a video category, a best effort category, or a background category. The operations may include causing to delay sending the frame on the wireless communication channel by a time delay based at least in part on a backoff window. The backoff window is based on a contention window associated with the access category.

According to example embodiments of the disclosure, there may include a method. The method may include identifying, by one or more processors, a trigger frame received from a first device on a wireless communication channel. The method may include determining a quality of service counter associated with an access category. The method may include causing to send a frame to the first device based at least in part on the trigger frame. The method may include determining an error condition associated with the frame. The method may include refraining from incrementing the quality of service counter based on the error condition.

The implementations may include one or more of the following features. The error condition includes a failure to receive an acknowledgment from the first device after causing to send the frame. The quality of service counter is at least one of a quality of service short retry counter (QSRC), a quality of service long retry counter (QLRC), a quality of service long drop-eligible retry counter (QLDRC), or a quality of service short drop-eligible retry counter (QSDRC). The method may further include determining a predetermined value is set to false, wherein the quality of service counter is a quality of service short retry counter (QSRC) or a quality of service long retry counter (QLRC). The method may include refraining from incrementing the quality of service counter. The method may further include determining a predetermined value is set to true, wherein the quality of service counter is a quality of service short drop-eligible retry counter (QSDRC) or a quality of service long drop-eligible retry counter (QLDRC). The method may include refraining from incrementing the quality of service counter. The access category is at least one of a voice category, a video category, a best effort category, or a background category. The method may further include causing to delay sending the frame on the wireless communication channel by a time delay based at least in part on a backoff window. The backoff window is based on a contention window associated with the access category.

According to example embodiments of the disclosure, there may include a method. The method may include encoding a frame with a quality of service counter update value. The method may include causing to send the frame to one or more devices belonging to a multiuser multiple input and multiple output (MU-MIMO) group. The method may include causing to send a trigger frame to at least one of the one or more devices. The implementations may include one or more of the following features. The method may further include determining an error condition associated with at least one data frame from the at least one of the one or more devices. The quality of service counter update value indicates to the at least one of the one or more devices to refrain from updating its quality of service counter when a transmission error is detected by the at least one of the one or more devices. The quality of service counter is at least one of a quality of service short retry counter (QSRC), a quality of service long retry counter (QLRC), a quality of service long drop-eligible retry counter (QLDRC), or a quality of service short drop-eligible retry counter (QSDRC).

In example embodiments of the disclosure, there may be an apparatus. The apparatus may include means for identifying, by one or more processors, a trigger frame received from a first device on a wireless communication channel. The apparatus may include means for determining a quality of service counter associated with an access category. The apparatus may include means for causing to send a frame to the first device based at least in part on the trigger frame. The apparatus may include means for determining an error condition associated with the frame. The apparatus may include means for refraining from incrementing the quality of service counter based on the error condition.

The implementations may include one or more of the following features. The error condition includes a failure to receive an acknowledgment from the first device after causing to send the frame. The quality of service counter is at least one of a quality of service short retry counter (QSRC), a quality of service long retry counter (QLRC), a quality of service long drop-eligible retry counter (QLDRC), or a quality of service short drop-eligible retry counter (QSDRC). The apparatus may further include means for determining a predetermined value is set to false, wherein the quality of service counter is a quality of service short retry counter (QSRC) or a quality of service long retry counter (QLRC). The apparatus may further include means for refraining from incrementing the quality of service counter. The apparatus may further include means for determining a predetermined value is set to true, wherein the quality of service counter is a quality of service short drop-eligible retry counter (QSDRC) or a quality of service long drop-eligible retry counter (QLDRC). The apparatus may further include means for refraining from incrementing the quality of service counter. The access category is at least one of a voice category, a video category, a best effort category, or a background category. The apparatus may further include means for causing to delay sending the frame on the wireless communication channel by a time delay based at least in part on a backoff window. The backoff window is based on a contention window associated with the access category.

An apparatus may further include encoding a frame with a quality of service counter update value. The apparatus may further include causing to send the frame to one or more devices belonging to a multiuser multiple input and multiple output (MU-MIMO) group. The apparatus may further include causing to send a trigger frame to at least one of the one or more devices.

The implementations may include one or more of the following features. The operations may further include determining an error condition associated with at least one data frame from the at least one of the one or more devices. The quality of service counter update value indicates to the at least one of the one or more devices to refrain from updating its quality of service counter when a transmission error is detected by the at least one of the one or more devices. The quality of service counter is at least one of a quality of service short retry counter (QSRC), a quality of service long retry counter (QLRC), a quality of service long drop-eligible retry counter (QLDRC), or a quality of service short drop-eligible retry counter (QSDRC).

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising memory and processing circuitry configured to:
    identify a trigger frame received from a first device on a wireless communication channel;
    determine a quality of service counter associated with an access category;
    cause to send a frame to the first device based at least in part on the trigger frame;
    determine an error condition associated with the frame; and
    refrain from incrementing the quality of service counter based on the error condition.

2. The device of claim 1, wherein the error condition includes a failure to receive an acknowledgment from the first device after causing to send the frame.

3. The device of claim 1, wherein the trigger frame is associated with a transmission duration.

4. The device of claim 1, wherein the quality of service counter is at least one of a quality of service short retry counter (QSRC), a quality of service long retry counter (QLRC), a quality of service long drop-eligible retry counter (QLDRC), or a quality of service short drop-eligible retry counter (QSDRC).

5. The device of claim 2, wherein the memory and the processing circuitry are further configured to:
  determine a predetermined value is set to false, wherein the quality of service counter is a quality of service short retry counter (QSRC) or a quality of service long retry counter (QLRC); and
  refrain from incrementing the quality of service counter.

6. The device of claim 2, wherein the memory and the processing circuitry are further configured to:
  determine a predetermined value is set to true, wherein the quality of service counter is a quality of service short drop-eligible retry counter (QSDRC) or a quality of service long drop-eligible retry counter (QLDRC); and
  refrain from incrementing the quality of service counter.

7. The device of claim 1, wherein the access category is at least one of a voice category, a video category, a best effort category, or a background category.

8. The device of claim 1, wherein the memory and the processing circuitry are further configured to cause to delay sending the frame on the wireless communication channel by a time delay based at least in part on a backoff window.

9. The device of claim 8, wherein the backoff window is based on a contention window associated with the access category.

10. The device of claim 1, further comprising a transceiver configured to transmit and receive wireless signals.

11. The device of claim 9, further comprising one or more antennas coupled to the transceiver.

12. A non-transitory computer-readable medium storing computer-executable instructions which when executed by one or more processors result in performing operations comprising:
  encoding a frame with a quality of service counter update value;
  causing to send the frame to one or more devices belonging to a multi-user multiple-input and multiple-output (MU-MIMO) group; and
  causing to send a trigger frame to at least one of the one or more devices.

13. The non-transitory computer-readable medium of claim 12, wherein the operations further comprise determining an error condition associated with at least one data frame from the at least one of the one or more devices.

14. The non-transitory computer-readable medium of claim 12, wherein the quality of service counter update value indicates to the at least one of the one or more devices to refrain from updating its quality of service counter when a transmission error is detected by the at least one of the one or more devices.

15. The non-transitory computer-readable medium of claim 14, wherein the quality of service counter is at least one of a quality of service short retry counter (QSRC), a quality of service long retry counter (QLRC), a quality of service long drop-eligible retry counter (QLDRC), or a quality of service short drop-eligible retry counter (QSDRC).

16. A method comprising:
  identifying, by one or more processors, a trigger frame received from a first device on a wireless communication channel;
  determining a quality of service counter associated with an access category;
  causing to send a frame to the first device based at least in part on the trigger frame;
  determining an error condition associated with the frame; and
  refraining from incrementing the quality of service counter based on the error condition.

17. The method of claim 16, wherein the error condition includes a failure to receive an acknowledgment from the first device after causing to send the frame.

18. The method of claim 16, wherein the quality of service counter is at least one of a quality of service short retry counter (QSRC), a quality of service long retry counter (QLRC), a quality of service long drop-eligible retry counter (QLDRC), or a quality of service short drop-eligible retry counter (QSDRC).

19. The method of claim 16, further comprising:
  determining a predetermined value is set to false, wherein the quality of service counter is a quality of service short retry counter (QSRC) or a quality of service long retry counter (QLRC); and
  refraining from incrementing the quality of service counter.

20. The method of claim 16, further comprising:
  determining a predetermined value is set to true, wherein the quality of service counter is a quality of service short drop-eligible retry counter (QSDRC) or a quality of service long drop-eligible retry counter (QLDRC); and
  refraining from incrementing the quality of service counter.

* * * * *